Dec. 11, 1945.    A. J. PETZINGER    2,390,811
ELECTRICAL MEASURING DEVICE
Filed Oct. 22, 1942    2 Sheets-Sheet 2
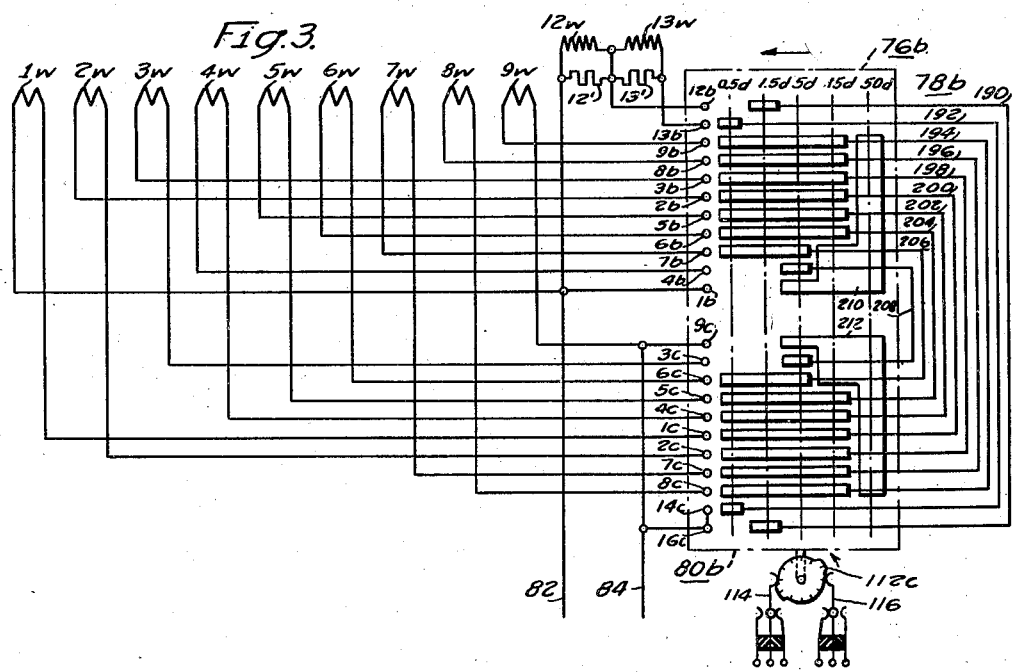
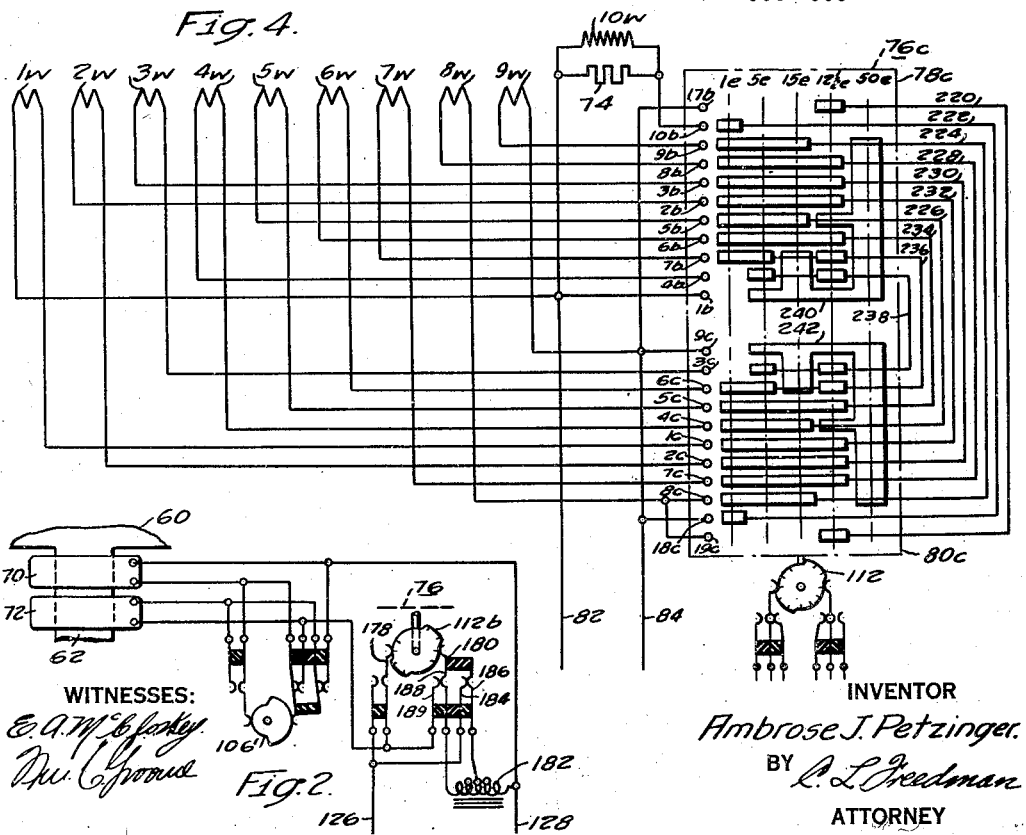

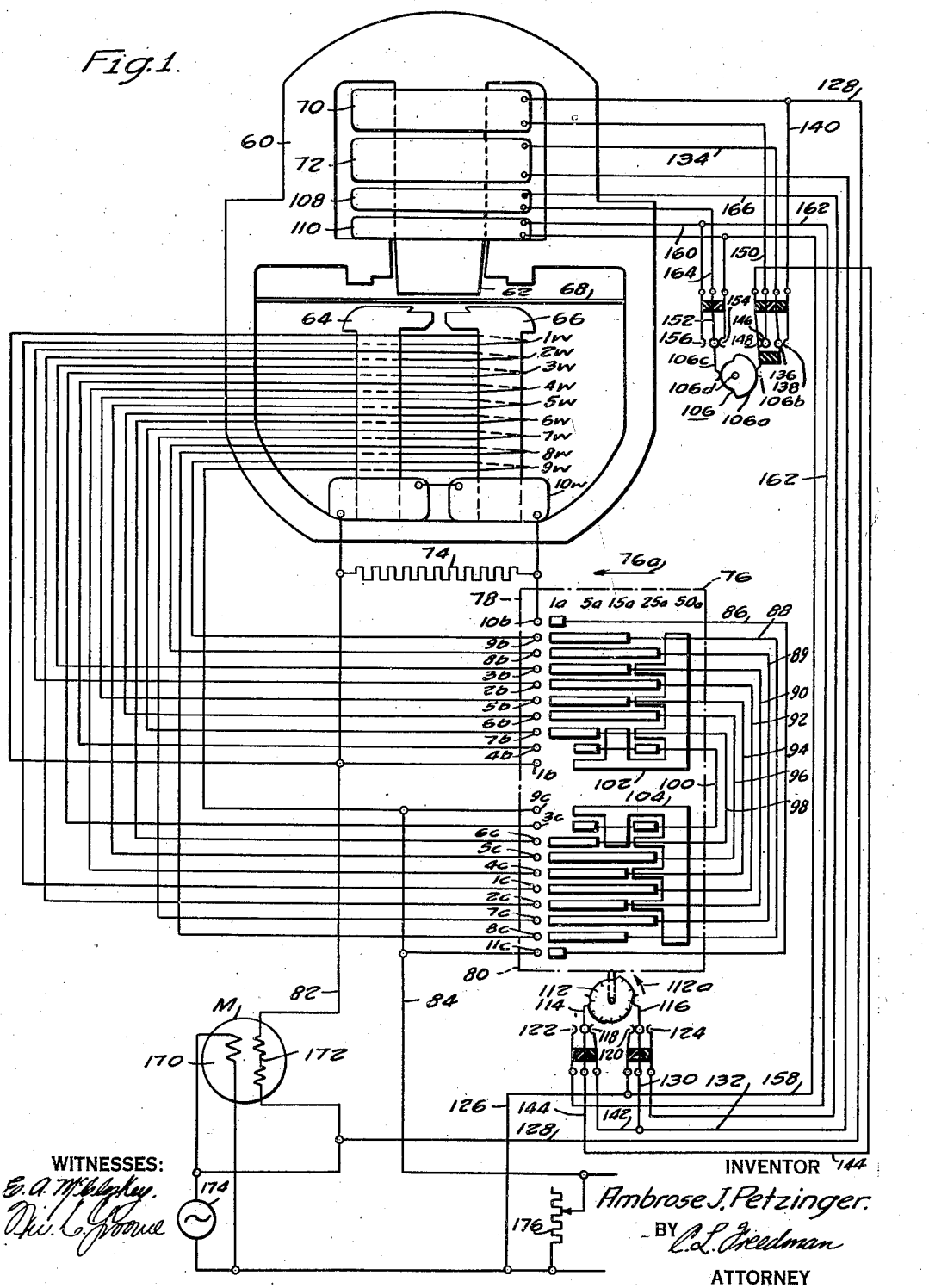

Patented Dec. 11, 1945

2,390,811

UNITED STATES PATENT OFFICE 2,390,811

ELECTRICAL MEASURING DEVICE

Ambrose J. Petzinger, Paterson, N. J., assignor to Westinghouse Electric Corporation, East Pittsburgh, Pa., a corporation of Pennsylvania Application October 22, 1942, Serial No. 462,968

16 Claims. (Cl. 171—34)

This invention relates to electrical measuring devices, and it has particular relation to measuring devices for measuring a function of a plurality of variable quantities and adjustable to cover a plurality of ranges of one of the variable quantities.

In certain classes of electrical measuring devices, provisions must be made for measuring a plurality of ranges of a variable quantity. If a separate measuring device is provided for each of the ranges of the variable quantity the construction of the measuring devices is substantially simplified. This simplification is attained, however, at the sacrifice of an increase in the number of measuring devices required. For this reason, it is desirable to provide a single measuring device which is adjustable for covering a plurality of ranges of the variable quantity. The problem may be understood more clearly by a consideration of watthour meters, and particularly of standard watthour meters.

For several years, the standard rated capacities of watthour meters have been 5, 15 and 50 amperes. These watthour meters are designed for operation at 120 and 240 volts. Some watthour meters are designed for higher voltages, such as 480 volts. In addition to the present standard capacities, a number of watthour meters are in service which have other rated current capacities.

In order to test or check watthour meters for accuracy, it is the practice to provide standard watthour meters which are sometimes referred to as "rotating standards" or more briefly as "standards." Such standards are adjustable to cover a plurality of ranges of watthour meters. For example, standard watthour meters are available for measuring current ranges represented by rated full load currents of 1, 5 and 15 amperes. Other standard watthour meters are available for measuring ranges represented by rated full load currents of 1, 5, 10, 25 and 50 amperes. Such standard watthour meters are also provided with adjustments covering two operating voltages, such as 120 and 240 volts.

In constructing standard watthour meters, it has been the practice to employ the same number of ampere turns per current pole for each of the rated full load currents covered by the adjustments of the standard watthour meter. For example, in a standard watthour meter having ranges represented by rated full load currents of 1, 5, 10, 25 and 50 amperes, the current windings may be adjusted to provide 50 ampere-turns per current pole when energized by each of the rated full load currents.

To date, no commercial standard watthour meter is available for measuring the standard watthour meter capacities represented by full load currents of 5, 15 and 50 amperes. This is for the reason that conventional practice would require the provision of 150 ampere-turns per current pole in such a standard watthour meter at the rated full load current in each range. The provision of such a standard watthour meter having 150 ampere-turns per current pole is impracticable.

In accordance with the invention, advantage is taken of the fact that a watthour meter measures a function of two variable quantities; namely, voltage and current. To provide a standard watthour meter capable of measuring current ranges represented by full load currents of 1, 5, 15, 25 and 50 amperes, the current windings of the standard watthour meter are designed to provide fewer ampere-turns for certain of the rated full load currents than for other of the rated full load currents. For example, in the standard watthour meter having the five ranges referred to, the windings may be arranged to provide 45 ampere-turns when energized by the rated full load currents of 1, 5 and 15 amperes in the first three ranges. The current windings also may be arranged to provide 50 ampere-turns when energized by rated full load currents of 25 and 50 amperes in the last two ranges.

In order to assure similar rotation of the standard watthour meter armature in each of its ranges, the voltage magnetic flux of the standard watthour meter is adjusted to compensate for the difference in ampere-turns produced in the various ranges. For example, the number of turns of the voltage winding of the standard watthour meter may be adjusted to provide a larger voltage magnetic flux in the 1, 5 and 15 ampere-capacity ranges of the standard watthour meter than in the 25 and 50 ampere-capacity ranges. Alternatively, transformer means may be provided for increasing the voltage applied to the voltage winding in the 1, 5 and 15 ampere-capacity ranges of the standard watthour meter sufficiently to provide similar operation of the standard watthour meter in all of its ranges.

A further problem is presented by the practice of testing watthour meters at full load and at light load. The light load conventionally employed for testing a watthour meter is one-tenth of the rated full load of the watthour meter. Heretofore, it has been the practice to apply the light load to both the watthour meter to be tested and the standard watthour meter associated therewith. For reasons well understood in the art, it is somewhat difficult to obtain accurate readings under light load conditions.

In accordance with a further aspect of the invention, a standard watthour meter is provided which provides operation similar to its rated full load operation when energized by currents corresponding to light load energization of the watthour meter to be tested. For the purpose of discussion, let it be assumed that a standard watthour meter is provided having ranges represented by rated full load currents of .5, 1.5, 5, 15 and 50 amperes, and that this standard watthour meter is to be employed for testing watthour meters which may fall in the ranges represented by rated full load currents of 5, 15 and 50 amperes. Such a standard watthour meter may be provided conveniently by designing the current windings to provide, for full load currents, 45 ampere-turns in the first four ranges for the rated full load currents of these ranges, and to provide 50 ampere-turns for the last range when energized by the rated full load current of this range. Compensation for the difference in ampere-turns may be provided as previously pointed out by employing a larger voltage magnetic flux in the standard watthour meter for the first four ranges.

When a watthour meter such as a 15 ampere-capacity watthour meter, is to be tested at full load, the standard watthour meter is adjusted to its 15 ampere range. When so adjusted the watthour meter to be tested and the standard watthour meter both rotate their armatures at the same rate of rotation if the watthour meter to be tested is operating correctly.

Let it be assumed next that the 15 ampere capacity watthour meter is to be tested at light load. Under these circumstances, the standard watthour meter is adjusted to its 1.5 ampere range. When the standard watthour meter and the watthour meter to be tested are energized by a current of 1.5 amperes at the rated voltage, the watthour meter to be tested rotates its armature at one-tenth its full load rate of rotation if the watthour meter to be tested is operating correctly. However, the standard watthour meter rotates its armature at the full load rate of rotation. This is for the reason that the standard watthour meter is adjusted to provide full load energization thereof when energized by one-tenth of the full load current of the watthour meter to be tested. Accurate readings of the standard watthour meter are readily obtained under these conditions.

A further problem is presented in testing watthour meters because of the provision of watthour meters having different basic watthour constants, which sometimes are termed disk constants. A watthour constant may be defined as the registration of one revolution of the rotating element per armature of the watthour meter expressed in watthours. In a standard line of watthour meters, a basic watthour constant of ⅓ is employed. This means that one rotation of the rotating element or armature of a 5 ampere watthour meter represents ⅓ watthour. In a similar manner, one rotation of the rotating element or armature of a 15 ampere watthour meter represents 1 watthour. One rotation of the rotating element or armature of a 50 ampere watthour meter represents 3⅓ watthours.

In another line of watthour meters, a basic watthour constant of 0.6 is employed but this basic watthour constant is not employed throughout the entire line. In this specific line, one rotation of the rotating element of a 5 ampere watthour meter represents 0.6 watthour. One rotation of the rotating element of a 50 ampere watthour meter represents 6 watthours, and one rotation of the 15 ampere watthour meter represents 1.5 watthours. From an inspection of these values, it will be observed that the 5 and 50 ampere watthour meters have a basic watthour constant of 0.6 whereas the 15 ampere watthour meter has a basic watthour constant of 0.5. This means that if a standard watthour meter having a basic watthour constant of 0.6 and having 5, 15 and 50 ampere ranges is employed for testing the aforesaid line of watthour meters, the standard watthour meter does not rotate its rotating element at the same rate as that of the watthour meter to be tested when the watthour meter to be tested is of the 15 ampere size. Although a formula is available for determining the percent accuracy of the watthour meter to be tested, despite the different rates of rotation, the required computations are objectionable for the reason that they require time and introduce a source of error.

For this reason, the invention also contemplates a standard watthour meter designed for operation at a predetermined basic watthour constant, such as 0.6 watthour, but having a special winding arrangement designed to produce the correct rate of rotation of its rotating element when the watthour meter to be tested has another basic watthour constant, such as 0.5. With such a watthour meter standard, the conversion formula is not required for testing watthour meters having different basic watthour constants.

It is, therefore, an object of the invention to provide an improved electrical measuring device for measuring a function of a plurality of quantities, one of which varies substantially over a plurality of ranges.

It is a further object of the invention to provide an electrical measuring device for measuring a function of two quantities, one of which varies over a plurality of ranges, with means for varying the response of the measuring device to one of said quantities for partially adjusting the measuring device to each of said ranges, and means for adjusting the response of the measuring device to the remaining quantity to complete the adjustment of the measuring device to each of said ranges.

It is another object of the invention to provide an electrical meter responsive to a function of voltage and current and suitable for measuring a plurality of ranges of current with means for varying the response of the meter to current to partially adjust the meter to each of the ranges, and means for varying the response of the meter to voltage to complete the adjustment of the meter to each of the ranges.

It is a still further object of the invention to provide a watthour meter having current windings adjustable to provide different ampere-turns for corresponding currents in a plurality of current ranges of the watthour meter and having voltage responsive means adjustable for completing the adjustment of the watthour meter for each of the current ranges.

It is an additional object of the invention to provide a standard watthour meter capable of producing the same full load and light load rate of rotation of its rotating element in each of a plurality of current ranges which are designed for watthour meters to be tested having different current capacities.

It is another object of the invention to provide an improved standard watthour meter capable of producing the same rate of rotation of its rotatable element when employed for testing watthour meters having different basic watthour constants.

Other objects of the invention will be apparent from the following description taken in conjunction with the accompanying drawings, in which:

Figure 1 is a schematic view of a watthour meter testing system embodying the invention; and Figs. 2, 3 and 4 are schematic views showing modifications of portions of the system of Fig. 1.

Referring to the drawings, Fig. 1 shows an electrical system embodying the invention. This system includes a standard watthour meter having a magnetic core 60. The magnetic core provides a voltage pole 62 and current poles 64 and 66 which are spaced to define an air gap within which a conductive rotating element or armature 68 is mounted for rotation. As well understood in the art, when a shifting magnetic field is produced in the air gap, a torque is applied to the armature 68 which operates to rotate the armature. In accordance with conventional practice, a permanent magnet (not shown) is provided for damping rotation of the armature 68 and a register (not shown) is provided for indicating the number of rotations of the armature 68.

For providing a shifting magnetic field in the air gap containing the armature 68, the voltage pole 62 is provided with a pair of voltage windings 70 and 72 and the current poles are provided with a plurality of windings $1w$ to $10w$. As well understood in the art, when these windings are energized suitably in accordance with the voltage and current of an electrical circuit, the armature 68 rotates at a rate dependent on the energy flowing in the electrical circuit.

The windings $1w$ to $9w$ each have one turn wound around each of the current poles 64 and 66. The windings $10w$ have the equivalent of 45 turns wound around each of the current poles 64 and 66. The turns around the respective current poles are wound in opposite directions so that when the currents in the turns direct a magnetic flux downwardly in the current pole 64, they also serve to direct a magnetic flux upwardly in the current pole 66 as viewed in Fig. 1. Conveniently the required effective energization of the winding $10w$ may be provided by winding one or more additional turns on each of the current poles such as 46 turns per current pole. A resistor 74 then is connected in shunt with the windings $10w$ and is proportioned to reduce the effectiveness of the winding $10w$ to the equivalent of exactly 45 turns per current pole.

In order to control the connections of the windings on the current poles 64 and 66, a drum controller 76 is provided having a plurality of positions $1a$, $5a$, $15a$, $25a$ and $50a$. This drum controller is shown in developed form in Fig. 1. In each of its positions, the drum controller is designed to group the windings $1w$ to $10w$ for energization in accordance with a different capacity of watthour meters to be tested. As a specific example, it is assumed that the positions of the drum controller are designed to energize the current windings of the standard watthour meter to test watthour meters with currents of 1 ampere, 5 amperes, 15 amperes, 25 amperes and 50 amperes. To provide the necessary grouping of windings, the drum controller 76 is divided into two control units 78 and 80.

The current windings of the standard watthour meter have ends which are associated with the drum controller 78. The windings $1w$ to $10w$ each have one end connected to terminals $1b$ to $10b$, respectively, of the control unit 78. In an analogous manner, the remaining ends of the windings $1w$ to $9w$ are connected, respectively, to the terminals $1c$ to $9c$ of the control unit 80. One of the conductors 82 supplying current to the standard watthour meter is connected to the remaining end of the winding $10w$ and to the terminal $1b$. The remaining conductor 84 supplying current to the standard watthour meter is connected to a terminal $11c$ on the control unit 80 and to the terminal $9c$.

Connections are provided on the drum controller 76 for establishing proper connections between the terminals thereof. For example, a tie conductor 86 has its ends connected to a contact segment on each of the control units 78 and 80 for establishing a connection between the terminals $10b$ and $11c$ when the drum controller 76 is in its first position $1a$. A tie conductor 88 has its ends connected to segments on the control units 78 and 80 for establishing a connection between the terminal $9b$ and the terminal $8c$ in the first three positions $1a$, $5a$ and $15a$ of the drum controller. A tie conductor 89 has its ends connected to contact segments on the control units 78 and 80 for establishing a connection between the terminal $8b$ and the terminal $7c$ in the first four positions, $1a$, $5a$, $15a$ and $25a$ of the drum controller. A tie conductor 90 has its ends connected to contact segments on the control units for establishing a connection between the terminal $3b$ and the terminal $2c$ in the first three positions $1a$, $5a$ and $15a$ of the drum controller. A tie conductor 92 has its ends connected to segments on the control units 78 and 80 for establishing a connection between the terminals $2b$ and $1c$ in the first four positions $1a$, $5a$, $15a$ and $25a$ of the drum controller. A tie conductor 94 has its ends connected to contact segments on the control units 78 and 80 for establishing a connection between the terminals $5b$ and $4c$ in the first three positions $1a$, $5a$ and $15a$ of the drum controller. A tie conductor 96 has its ends connected to contact segments on the control units for establishing a connection between the terminals $6b$ and $5c$ in the first four positions $1a$, $5a$, $15a$ and $25a$ of the drum controller. A tie conductor 98 has its ends connected to contact segments on the control units for establishing a connection between the terminals $7b$ and $6c$ in the first two positions $1a$ and $5a$ of the drum controller. A tie conductor 100 has its ends connected to contact segments on the control units for establishing a connection between the terminals $4b$ and $3c$ in the positions $5a$ and $25a$ of the drum controller.

The control unit 78 also carries a segment 102 which engages the terminal $1b$ in the position $5a$ of the drum controller. In the position $15a$ of the drum controller the contact segment 102 engages the terminals $1b$, $4b$ and $7b$. The terminals $1b$, $7b$, $5b$ and $3b$ are engaged by the contact segment 102 in the position $25a$ of the drum controller 76. All of the terminals $1b$ to $9b$ inclusive, are engaged by the contact segment 102 in the position $50a$ of the drum controller 76.

In a somewhat similar manner, the control unit 80 includes a contact segment 104 which engages the terminal $9c$ in the position $5a$ of the drum controller. The contact segment 104 engages the terminals $9c$, $3c$ and $6c$ in the position $15a$ of the drum controller. In the position $25a$ of the drum controller, the contact segment 104 engages the terminals $9c$, $6c$, $4c$ and $2c$. Finally, in the position $50a$ of the drum controller 76, the contact segment 104 engages the terminals $1c$ to $9c$ inclusive, of the control unit 80.

By inspection of Fig. 1, it will be observed that when the drum controller 76 is in its position $1a$, only the windings $10w$ are energized from the conductors 82 and 84. Consequently, if one ampere flows through the conductors 82 and 84 a magnetomotive force corresponding to 45 ampere turns per pole is developed for urging magnetic flux through the current poles 64 and 66.

When the drum controller 76 is in its position 5a, the windings 1w–9w are connected in series across the conductors 82 and 84. This means that when 5 amperes flow in the conductors 82 and 84, 45 ampere turns per pole again are available for the current poles 64 and 66.

In the position 15a of the drum controller 76, current flowing through the conductors 82 and 84 passes through the windings 1w, 4w and 7w in parallel. This same current then passes through the windings 2w, 5w and 8w in parallel and finally through the windings 3w, 6w and 9w in parallel. In other words, current must flow through three groups of windings connected in series. Each of these groups includes 3 parallel connected windings. Consequently, when 15 amperes flow through the conductors 82 and 84, 45 ampere turns per current pole are again produced.

Should the drum controller 76 be in its position 25a, current flowing through the conductors 82 and 84 passes through the windings 1w, 3w, and 5w in parallel. The current then passes through the windings 2w, 4w and 6w in parallel. In this case the current passes through two groups of windings connected in series, each of the groups comprising 3 parallel-connected windings. For this reason, when 25 amperes flow in the conductors 82 and 84, 50 ampere turns per current pole are developed.

When the drum controller 76 is in its position 50a, all of the windings 1w–9w are connected in parallel. Consequently, 50 amperes flowing in the conductors 82 and 84 divides among these 9 windings and produces 50 ampere turns per current pole.

As previously explained, if it were desired to provide the same number of ampere turns for each position of the drum controller, it would be necessary to work on a basis of 150 ampere turns. By employing two groups of 45 ampere turns and 50 ampere turns, respectively, a material saving in the required ampere turns is effected.

In order to provide voltage magnetic flux for the voltage pole 62, one or more voltage windings are provided. In the specific example illustrated in Fig. 1, the two voltage windings 70 and 72 are provided and are of similar size. For this reason, the windings may be connected in parallel for operation at a first voltage, or in series for operation at a second voltage which is twice the magnitude of the first voltage without change in the number of ampere-turns available for the voltage pole. For example, the windings 70 and 72 may be proportioned for energization in parallel at 120 volts or for energization in series at 240 volts. Alternatively, these windings may be proportioned for series operation at 480 volts and parallel operation at 240 volts. To connect the windings 70 and 72 either in series or in parallel, a suitable switch 106 may be provided. The operation of this switch will be described in detail below.

If the same energization of the voltage pole 62 were provided for each of the positions of the drum controller 76, the rotation of the armature 68 would not be the same for energization of the current windings by rated current in each of the 5 positions of the drum controller. This is for the reason that in 3 positions of the drum controller the current windings develop 45 ampere-turns per current pole whereas in the remaining two positions, the current windings develop 50 ampere turns per current pole at the respective rated currents. To compensate for this difference in the energization of the current windings, the energization of the voltage pole 62 is suitably varied.

Referring to Fig. 1, it will be observed that the voltage pole 62 is provided with two auxiliary voltage windings 108 and 110. In the positions 25a and 50a of the drum controller 76, one of the auxiliary voltage windings 108 and 110 is connected in series with each of the main voltage windings 70 and 72. Because of the increased number of effective turns provided in these positions, the voltage magnetic flux required to produce a back-electromotive-force equal to the applied voltage is substantially reduced. By suitably proportioning the auxiliary voltage windings 108 and 110, the reduction in voltage magnetic flux may be proportioned to provide the same rotation of the armature 68 in the positions 25a and 50a of the drum controller as the rotation of the armature in the positions 1a, 5a and 15a of the drum controller 76 when the current windings are energized by corresponding currents in the various ranges.

Although the auxiliary voltage windings 108 and 110 may be connected to the main voltage windings 70 and 72 by means of a separately operated switch, preferably switch means is provided which is operated by rotation of the drum controller 76. To this end, the drum controller 76 has associated therewith a cam 112 which rotates in the direction of the arrow 112a when the drum controller 76 is actuated in the direction of the arrow 76a. The cam 112 is positioned between two resilient fingers 114 and 116 having contacts for engaging contacts 118 and 120 or 122 and 124, depending on the position of the cam 112. The resiliency of the fingers 114 and 116 urges or biases these fingers towards the contacts 118 and 120. When the raised portions of the cam 112 engage the fingers 114 and 116, the fingers are urged against their biases into engagement with the contacts 122 and 124. By inspection of Fig. 1, it will be observed that the raised portions of the cam 112 are proportioned to engage the fingers 114 and 116 in the positions 25a and 50a of the drum controller 76.

The contacts associated with the cam 112 control the connection of the auxiliary voltage windings 108 and 110 to the main voltage windings 70 and 72. In the positions of the fingers 114 and 116 illustrated in Fig. 1, the auxiliary voltage windings 108 and 110 are deenergized. The fingers 114 and 116 occupy the illustrated positions when the drum controller 76 occupies its position 1a, 5a and 15a. When the drum controller 76 is in its positions 25a and 50a, the raised portions of the cam 112 actuate the fingers 114 and 116 into engagement with the contacts 122 and 124. These contacts operate to connect the auxiliary voltage windings 108 and 110 in series with the main voltage windings 70 and 72.

The voltage windings are energized from a pair of conductors 126 and 128. With the switches in the positions illustrated in Fig. 1 an energizing circuit for the voltage windings may be traced from the conductor 126, through the contact 120, the conductor 130, the conductor 132, the voltage winding 72, a conductor 134, contacts 136 and 138, of the voltage switch 106, and a conductor 140 to the conductor 128. A second circuit may be traced from the conductor 126 through the contact 120, the conductor 130, a conductor 142, the contact 118, a conductor 144, the contacts 146 and 148 of the switch 106, a conductor 150, and the voltage winding 70 to the conductor 128. Consequently, the voltage windings 70 and 72 alone are connected in parallel across the conductors 126 and 128.

As previously explained, the switch 106 controls the parallel and series connections of the voltage windings. In the position of the switch 106 illustrated in Fig. 1, the voltage windings are connected in parallel for operation at a predetermined voltage such as 120 volts. In this position of the switch, a rotatable cam 106a has a raised portion engaging a resilient finger 106b and a depressed portion engaging a resilient finger 106c. These resilient fingers have biases urging the fingers towards the axis 106d about which the cam rotates. When the cam 106a is rotated 180° to bring its raised portion into engagement with the finger 106c and its depressed portion into engagement with the finger 106b, the contacts 136 and 148 are separated respectively from the contacts 138 and 146. In addition, a contact 152 carried by the resilient finger 106c moves from engagement with a fixed contact 154 into engagement with a fixed contact 156. Such operation of the switch 106 connects the voltage windings 70 and 72 in series through a circuit which may be traced from the conductor 126, through the contact 120, a conductor 130, the conductor 132, the voltage winding 72, the conductor 134, the contacts 136 and 146, the conductor 150 and the voltage winding 70 to the conductor 128.

When the drum controller 76 moves into one of its positions 25a or 50a, the fingers 114 and 116 are moved into engagement with the contacts 122 and 124. Such movement of the fingers results in the connection of the auxiliary voltage windings 108 and 110 in series with the main voltage windings 70 and 72. Such connection may be traced from the conductor 126 through the conductor 158, the auxiliary voltage winding 110, a conductor 160, a conductor 162, the contact 122, the conductor 144, the contacts 148 and 146, the conductor 150, and the voltage winding 70 to the conductor 128. Consequently, the auxiliary voltage winding 110 and the main voltage winding 70 are connected in series across the conductors 126 and 128.

A second energizing circuit may be traced from the conductor 126 through the conductor 158, the contact 154, a conductor 164, the auxiliary voltage winding 108, a conductor 166, the contact 124, the conductor 130, the conductor 132, the main voltage winding 72, the conductor 134, the contacts 136 and 138, and the conductor 140 to the conductor 128. Consequently, the auxiliary voltage winding 108 and the main voltage winding 72 are connected in series across the conductors 126 and 128.

With the drum controller 76 in one of its positions 25a or 50a, should the cam 106a of the switch 106 be actuated to bring its raised portion into engagement with the finger 106c, it would be found that the auxiliary voltage windings 108 and 110 and the main voltage windings 70 and 72 all would be connected in series across the conductors 126 and 128. It is believed that these connections may be readily traced on Fig. 1.

It is believed that the operation of the standard watthour meter illustrated in Fig. 1 is apparent from the foregoing description thereof. Let it be assumed that a watthour meter M is to be tested. This watthour meter has a voltage winding 170 which will be assumed to have a voltage rating of 120 volts and current windings 172 which are assumed to have a current rating of 5 amperes. In order to test the watthour meter, a source of voltage 174 having the desired voltage rating and an adjustable load represented by an adjustable resistor 176 are provided.

The voltage winding of the meter M is connected across the source 174 for energization in accordance with the voltage thereof. In an analogous manner, the conductors 126 and 128 are connected for energization in accordance with the voltage of the source 174. If the voltage windings 70 and 72 are designed for energization in parallel at 120 volts and in series at 240 volts, the switch 106 is left in the position illustrated in Fig. 1. This means that the voltage windings 70 and 72 are connected in parallel for energization in accordance with the voltage of the source 174.

Since the watthour meter M is assumed to have a rated current capacity of 5 amperes, the drum controller 76 is moved to its positions 5a. In this position of the drum controller, the current windings 1w–9w are connected in series with the current windings 172 between the source 174 and the load 176. The load 176 is then adjusted to provide a current flow of 5 amperes. The rotation of the rotating element or armature of the watthour meter M to be tested and the rotation of the armature of the standard watthour meter then may be compared in the conventional manner.

If the voltage winding 170 were designed for energization at 240 volts, it would have been necessary to rotate the cam 106a of the switch 106 to bring its raised portion into engagement with the finger 106c. This would have connected at voltage windings 70 and 72 in series for energization in accordance with the voltage of the source 174.

Had the current windings 172 been designed for a rated current capacity of 50 amperes, it would have been necessary to operate the drum controller 76 into the position 50a. In this position of the drum controller all of the windings 1w–9w are connected in parallel and the parallel group is connected in series with the current windings 172 of the watthour meter M to be tested for energization in accordance with current supplied by the source 174.

At the same time, operation of the drum controller 76 to its position 50a brings the raised portions of the cam 112 into engagement with the fingers 114 and 116. As previously explained, such actuation of the fingers 114 and 116 connects the auxiliary voltage windings 108 and 110 respectively in series with the main voltage windings 70 and 72. The resulting decrease in voltage magnetic flux produced in the voltage pole 62 compensates for the increase in ampere turns per current pole from 45 in the position 5a of the drum controller to 50 in the position 50a of the drum controller when rated current flows through the current windings. It will be understood also that the load 176 is adjusted to produce the required current flow of 50 amperes through the watthour meters in order to make a full load test thereof. Tests of the watthour meter M may be conducted at other loads, such as at light loads, by proper adjustment of the load 176.

In Fig. 1, proper adjustment of the voltage magnetic flux in the voltage pole 62 is effected by proper connections of the auxiliary voltage windings 108 and 110. If desired, these auxiliary voltage windings may be omitted and adjustment of the voltage magnetic flux may be effected by varying the voltage applied to the voltage windings 70 and 72. Such a modification is illustrated in Fig. 2.

Referring to Fig. 2, the voltage windings 70 and 72 are connected for energization from the conductors 126 and 128 through a switch 106' which corresponds to the switch 106 of Fig. 1 and a switch controlled by a cam 112b which corresponds to the cam 112 of Fig. 1. It will be understood that the cam 112b is connected for operation by movement of the drum controller 76 in a manner similar to the connection of the cam 112.

As shown in Fig. 2, a pair of resilient fingers 178 and 180 are associated with the cam 112b and are urged towards the center thereof. The cam 112b is provided with raised portions which engage the resilient fingers 178 and 180 when the drum controller 76 is in its positions 25a and 50a. The depressed portions of the cam 112b engage the fingers 178 and 180 in the positions 1a, 5a and 15a of the drum controller 76.

In the position of the cam 112b illustrated in Fig. 2, energization of the voltage windings 70 and 72 is effected through a transformer 182 which conveniently may be of the auto-transformer type. The primary section of the auto-transformer 182 is connected for energization across the conductors 126 and 128 through a fixed contact 184 and a movable contact 186 which is actuated in accordance with movement of the movable finger 180. The secondary section of the auto-transformer 182 is connected between the conductor 128 and a movable contact 188 which also is associated with the finger 180 for movement therewith.

In the position of the parts illustrated in Fig. 2, the movable contact 188 engages a fixed contact 189. This connects the windings 70 and 72 across the secondary section of the auto-transformer 182 for energization at a voltage higher than that across the conductors 126 and 128.

The switch 106' again controls the series or parallel connection of the voltage windings 70 and 72. Because of the omission of the auxiliary windings 108 and 110, the construction of the switch 106' is somewhat simpler than that of the switch 106 of Fig. 1. It is believed that the parallel and series connections for the two positions of the switch 106' may be readily traced in Fig. 2.

When the drum controller 76 is actuated to move the raised portions of the cam 112b into engagement with the fingers 178 and 180, the contacts 188 and 186 are separated respectively, from the fixed contacts 189 and 184. Such separation of the contacts removes the auto-transformer 182 from service and connects the voltage windings 70 and 72 directly across the conductors 126 and 128. As previously pointed out, the cam 112b is proportioned to establish this direct connection of the voltage windings 70 and 72 only for the positions 25a and 50a of the drum controller.

It will be understood that the auto-transformer 182 increases the voltage applied to the voltage windings 70 and 72 in the positions 1a, 5a and 15a of the drum controller by an amount sufficient to compensate for the reduced number of ampere turns available in the current windings in these positions of the drum controller. For example, if the voltage of the conductors 126 and 128 is 120 volts, the secondary section of the auto-transformer 182 may be designed to produce an output voltage of about 133.3 volts. When so proportioned, corresponding currents in each of the ranges of the drum controller 76 produce the same rotation of the armature of the standard watt-hour meter.

It is standard practice in the art to test watt-hour meters at full load and at light load. For the full load test rated full load current is supplied to the watthour meter whereas for the light load test one-tenth of rated full load current conventionally is applied to the watthour meter. To facilitate tests of this character, the system of Fig. 1 may be modified as illustrated in Fig. 3. Referring to Fig. 3, a drum controller 76b is provided which corresponds to the drum controller 76 of Fig. 1. This drum controller 76b has 5 positions, 0.5d, 1.5d, 5d, 15d and 50d for controlling the connections of the windings 1w to 9w of the standard watthour meter. Instead of the single winding 10w, the current poles of the standard watthour meter are provided with two windings 12w and 13w. These windings are designed to provide respectively 30 and 60 effective turns. Conveniently the current windings 12w and 13w may have a larger number of turns, such as 31 and 61 respectively. Shunting resistors 12' and 13' then may be connected thereacross and proportioned to make the windings 12w and 13w equivalent to exactly 30 and 60 effective turns.

The drum controller 76b is divided into a control unit 78b and a control unit 80b which are associated with the ends of the various windings. For example, the control unit 78b has terminals 1b to 9b to which are connected, respectively, one end of each of the windings 1w to 9w. In a similar manner, the control unit 80ᵇ has terminals 1c to 9c to which are connected respectively, one end of each of the windings 1w to 9w. The windings 12w and 13w each have an end connected to a common terminal 12ᵇ. The remaining end of the winding 13w is connected to a terminal 13b which is associated with control unit 78b. One of the conductors 82 which supplies current to the windings is connected to the remaining end of the winding 12w and to the terminal 1b.

The other conductor 84 for supplying current to the windings is connected to the terminal 9c and to two additional terminals 14c and 16c on the control unit 80b.

For establishing proper connections of the various windings, a tie conductor 190 has its ends connected to contact segments respectively on the control units 78b and 80b for connecting the terminals 12b and 16c in the position 1.5d of the drum controller 76b. A tie conductor 192 has contact segments connected to its ends for establishing a connection between the terminals 13b and 14c in the 0.5d position of the drum controller 76b. In an analogous manner, tie conductors 194, 196, 198, 200, 202 and 204 are provided each having contact segments at its ends for establishing connections between the terminal 9b and the terminal 8c, between the terminal 8b and the terminal 7c, between the terminal 3b and the terminal 2c, between the terminal 2b and the terminal 1c, between the terminal 5b and the terminal 4c, and between the terminal 6b and the terminal 5c in the positions 0.5d, 1.5d, 5d and 15d of the drum controller 76b. A tie conductor 206 has contact segments for establishing a connection between the terminal 7b and the terminal 6c in the first three positions 0.5d, 1.5d and 5d of the drum controller. A tie conductor 208 has contact segments establishing a connection between the terminals 4b and 3c in the position 5d of the drum controller 76b.

In addition, the control unit 78b has a contact segment 210 for engaging the contact 1b in the position 5d of the drum controller; for engaging the terminals 1b, 4b and 7b in the position 15d of the drum controller; and for engaging all of the terminals 1b to 9b in the position 50d of the drum controller. In a similar manner, the control unit 80b has a contact segment 212 for engaging the terminal 9c in the position 5d of the drum controller; for engaging the terminals 9c, 3c, and 6c in the position 15d of the drum controller; and for engaging all of the terminals 1c to 9c in the position 50d of the drum controller.

When the drum controller 76b is in its position 0.5d, the windings 12w and 13w are connected in series across the conductors 82 and 84. Consequently, when these conductors supply .5 of an ampere to the windings, 45 ampere turns per current pole are produced in the standard watthour meter.

When the drum controller 76b is in the position 1.5d, the winding 12w is connected across the conductors 82 and 84. Therefore, when these conductors supply 1.5 amperes to the standard watthour meter, 45 ampere turns per current pole are produced.

If the drum controller 76b is in its position 5d, all of the windings 1w to 9w inclusive, are connected in series across the conductors 82—84. Therefore, a flow of 5 amperes in the conductors 82 and 84 represents 45 ampere turns per current pole in the standard watthour meter.

In the position 15d of the drum controller, current supplied by the conductors 82 and 84 flows first through the windings 1w, 4w and 7w in parallel, then through the windings 2, 5 and 8 in parallel, and finally through the windings 3, 6 and 9 in parallel. For this reason, a flow of 15 amperes in the conductors 82 and 84 again produces 45 ampere turns per current pole in the standard watthour meter.

Finally, in the position 50d of the drum controller, all of the windings 1w-9w are connected in parallel across the conductors 82 and 84. Therefore, a flow of 50 amperes through the conductors 82 and 84 results in the application of 50 ampere turns per current pole to the standard watthour meter.

It will be observed that all of the positions of the drum controller 76b produce 45 ampere turns per current pole at the respective rated current capacities, except for the position 50d which produces 50 ampere turns per current pole. To compensate for this difference, a smaller voltage magnetic flux is supplied to the standard watthour meter for the position 50d than for the remaining positions. To this end, the drum controller 76b is provided with a cam 112c which corresponds to the cam 112 of Fig. 1, and which controls the connections of the windings 70, 72, 108 and 110 in the same manner. However, the raised portions of the cam 112c are proportioned to engage the associated contact fingers 114 and 116 only in the position 50d of the associated drum controller 76b.

The operation of the modification illustrated in Fig. 3 will be understood from the discussion of Fig. 1. If it is desired to conduct a full-load test of a 5 ampere, 15 ampere or 50 ampere capacity watthour meter, the drum controller 76b is set in its appropriate position 5d, 15d or 50d. In each of these positions, the full-load test of the appropriate watthour meter may be conducted as discussed with reference to Fig. 1.

Should it be desired to conduct a light load test of a 5 ampere, 15 ampere or 50 ampere capacity watthour meter, the drum controller 76b is placed in the appropriate position 0.5d, 1.5d or 5d. These positions assure full load operation of the standard watthour meter despite the fact that the associated watthour meter to be tesed is energized a one-tenth its rated full load. Such operation of the standard watthour meter facilitates greatly the determination of its operation under the conditions of the test. In other words, the modification of Fig. 3 provides the same resultant energization of the standard watthour meter for both a full load test and a light load test of any watthour meter to be tested. If the meter to be tested is run one revolution for a light load test and ten revolutions for a full load test, the standard watthour meter indicates the error in each case on the same scale and in the same degree. For example, if the standard meter indicates 10.05 revolutions when energized for one revolution of the test meter at light load or for ten revolutions of the test meter at full load, the standard meter indicates an error of 0.5% in each case.

A still further problem is presented by the variation in watthour constant of various watthour meters. For example, let it be assumed that three watthour meters are to be tested having rated full load current capacities of 5 amperes, 15 amperes and 50 amperes respectively. Let it be assumed further that the 5 ampere and 50 ampere watthour meters have basic watthour constants of 0.6 watthour. This means that one revolution of the armature of the 5 ampere watthour meter corresponds to a registration of .6 watthour. One revolution of the armature of the 50 ampere meter corresponds to a registration of 6 watthours.

Let it be assumed further, however, that the 15 ampere capacity watthour meter has a basic watthour constant of 0.5 watthour. This means that one revolution of the armature of the 15 ampere capacity watthour meter produces a registration of 1.5 watthours.

If the standard watthour meter is designed to have a constant basic watthour constant of 0.6, it follows that the armature of the standard watthour meter when conneced to test the 15 ampere capacity watthour meter rotates at a rate of rotation differing from the rate of rotation of the 15 ampere capacity watthour meter to be tested. As understood in the art, the accuracy of the watthour meter to be tested may be determined by suitable computations. For example, let it be assumed that the watthour meter to be tested under the conditions of the test has an armature rotation of $r$ revolutions and a watthour constant of $k_h$. Let it be assumed further that the standard watthour meter under the same conditions has an armature rotation of R revolutions and a watthour constant $K_h$. Under these conditions, the percent accuracy of the watthour meter under test is represented by the formula $$\frac{100 r k_h}{R K_h}$$

In order to simplify the testing of watthour meters having different basic watthour constants, the modification illustrated in Fig. 4 may be employed. Referring to Fig. 4, a drum controller 76c is disclosed which may replace the drum controller 76 of Fig. 1. The drum controller 76c has 5 positions, 1e, 5e, 15e, 12½e and 50e. The positions 1e, 5e, 15e and 50e are designed to test watthour meters having the same basic watthour constants, such as 0.6 watthour, and having rated current capacities, respectively, of 1, 5, 15 and 50 amperes. The operation of the controller under these conditions is similar to that of the drum controller 76 of Fig. 1.

For facilitating the testing of a 15 ampere capacity watthour meter having a different basic watthour constant, such as 0.5 watthour, the drum controller 76c is provided with the position 12½e which is designed to produce a full load operation of the standard watthour meter when the standard watthour meter is supplied from the conductors 82 and 84 with a current of 12½ amperes. This means that when 15 amperes of current are supplied to both the watthour meter to be tested and the standard watthour meter, the armatures of both of the meters rotate at the same rate of rotation. Such operation of the meters greatly simplifies the test procedure. It will be observed that the 12½ ampere energization of the standard watthour meter is determined by multiplying the 15 ampere capacity of the watthour meter to be tested by the ratio of basic watthour constants of the watthour meter to be tested and the standard watthour meter. In other words, 12½ is equal to (0.5/0.6) ×15.

As shown in Fig. 4, the windings 1w to 10w are associated with the terminals 1b to 10b of a first control unit 78c and with terminals 1c to 9c of a second control unit 80c in a manner somewhat analogous to that disclosed in Fig. 1. One of conductors 82 which supplies current to the windings is connected to one terminal of the coil 10w and the terminal 1b. The remaining conductor 84 is connected to the terminal 9c, a terminal 17b associated with the control unit 78c, and a terminal 18c associated with the control unit 80c. In addition, the terminal 8c of the control unit 80c is connected to an additional terminal 19c.

For properly associating the contact segments of the control units, a tie conductor 220 is provided having its ends connected to contact segments which connect the terminal 17b to the terminal 19c at the position 12½e of the drum controller 76c. The tie conductor 222 has its ends associated with contact segments for connecting the terminals 10b and 18c in the position 1e of the drum controller. Tie conductors 224 and 226 are associated with contact segments for establishing connections between terminals 9b and 8c; and between 5b and 4c in the first three positions 1e, 5e and 15e of the drum controller. Contact segments at the ends of the tie conductors 228, 230, 232 and 234 establish connections between the terminals 8b and 7c, between 3b and 2c, between 2b and 1c, and between 6b and 5c in the first four positions 1e, 5e, 15e and 12½e of the drum controller. A tie conductor 236 has contact segments at its ends for establishing connections between the terminals 7b and 6c in the positions 1e, 5e and 12½e of the drum controller. Finally, a tie conductor 238 has contact segments for establishing a connection between the terminals 4b and 3c in the positions 5e and 12½e of the drum controller.

In addition, the control unit 78c is provided with a contact segment 240 which engages the terminal 1b in the position 5e of the drum controller, the terminals 1b, 4b and 7b in the position 15e of the drum controller, the terminals 1b and 5b in the position 12½e of the drum controller, and all of the terminals 1b to 9b inclusive, in the position 50e of the drum controller. Similarly, the control unit 80c has a contact segment 242 for engaging the terminal 9c in the position 5e of the drum controller, the terminals 9c, 3c and 6c in the position 15e of the drum controller, the terminals 9c and 4c in the position 12½e of the drum controller, and all of the terminals 1c to 9c inclusive, in the position 50e of the drum controller.

If it were desired to provide ranges corresponding to the positions 1e, 5e, 12½e and 50e only of the drum controller 78c, it would be possible to employ a 50 ampere turn per current pole energization of a standard watthour meter for each of these ranges. However, since it is desired to provide in addition thereto a range for testing 15 ampere capacity watthour meters, it is convenient to provide 45 ampere turns per current pole in some of the ranges. For example, in the position 1e the winding 10w alone is connected across the conductors 82 and 84 to provide 45 ampere turns per current pole when one ampere flows therethrough. In the position 5e, the windings 1w to 9w are connected in series across the conductors 82 and 84 to provide 45 ampere turns per current pole when 5 amperes flow therethrough. In the position 15e of the drum controller 15 amperes flow successively through the windings 1w, 4w and 7w in parallel, the windings 2w, 5w and 8w in parallel, and the windings 3w, 6w and 9w in parallel to provide 45 ampere turns per current pole.

In the position 12½e, 12½ amperes flow successively through the windings 1w and 5w in parallel, the windings 2w and 6w in parallel, the windings 3w and 7w in parallel and the windings 4w and 8w in parallel, to provide 50 ampere turns per current pole. In the final position, 50 amperes flow through the windings 1w to 9w in parallel to provide 50 ampere turns.

Since the last two positions of the drum controller alone provide 50 ampere turns per current pole when rated current flows therethrough, whereas the remaining positions provide 45 ampere turns per current pole, the cam 112 and associated switching mechanism again are employed to control the connections of the voltage windings 70, 72, 108 and 110. It is believed that the operation of the modification illustrated in Fig. 4 is clear from the discussion of the operation of the system illustrated in Fig. 1.

Although the invention has been described with reference to certain specific embodiments thereof, numerous modifications are possible. Therefore, the invention is to be restricted only by the appended claims as interpreted in view of the prior art.

I claim as my invention:

1. In a measuring device for measuring a function of a plurality of variable quantities and for providing the same response for each of a plurality of ranges of a first one of said variable quantities, a measuring unit having first operating means and second operating means for energization respectively by said first one and a second one of said variable quantities, said measuring unit including translating means responsive to the combined energizations of both of said operating means, control means for adjusting said first operating means to vary the energization of said first operating means by said first quantity and to adjust said measuring unit partially for the same response of said translating means to each of said ranges of said first quantity, and control means for modifying the energization of said second operating means by said second quantity sufficiently to complete the adjustment of said measuring unit for each of said ranges of said first quantity.

2. In a measuring device for measuring a function of a plurality of variable quantities and for providing the same response for each of a plurality of ranges of a first one of said variable quantities, a measuring unit having first operating means and second operating means for energization respectively by said first one and a second one of said variable quantities, said measuring unit including translating means responsive to the combined energizations of both of said operating means, control means for adjusting said first operating means to vary the energization of said first operating means by said first quantity and to adjust said measuring unit partially for the same response of said translating means to each of said ranges of said first quantity, control means for modifying the energization of said second operating means by said second quantity sufficiently to complete the adjustment of said measuring unit for each of said ranges of said first quantity, and common means for operating both of said control means.

3. In a measuring device for measuring a function of current and voltage in electrical circuits and for providing the same response for each of a plurality of ranges of current, a measuring unit having first operating means and second operating means for energization respectively by current and voltage, said measuring unit including translating means responsive to the combined energizations of both of said operating means, control means for adjusting said first operating means to vary the energization of said first operating means by said first quantity and to adjust said measuring unit partially for the same response of said translating means to each of said ranges of current, and control means for modifying the energization of said second operating means by voltage sufficiently to complete the adjustment of said measuring unit for each of said ranges of current.

4. In a measuring device for measuring a function of the product of voltage and current in an electrical circuit and for providing the same response for each of a plurality of ranges of current, operating means for said measuring device including a plurality of current windings, means for energizing certain of said windings for each of said ranges of current, said windings being arranged to provide less ampere-turns for currents in certain of said ranges than for corresponding currents in other of said ranges of current, voltage operating means for said measuring device, said measuring device including translating means responsive to the combined energizations of said operating means, and means effective when said current windings are arranged to provide said lesser ampere-turns for modifying the energization of said voltage operating means sufficiently to provide the same response of said translating means for each of said ranges.

5. In a measuring device for measuring a function of the product of voltage and current in an electrical circuit and for providing the same response for each of a plurality of ranges of current magnitudes, operating means for said measuring device including a plurality of current windings, means for increasing the number of effective turns of said windings for the lesser of said ranges of current magnitudes, said windings being arranged to provide different numbers of ampere-turns for corresponding currents in said ranges which are intended to provide the same response of said measuring device, voltage responsive operating means for said measuring device, said measuring device including translating means responsive to the combined energizations of said operating means, and means effective when said current windings are arranged to provide the lesser of said different numbers of ampere-turns for increasing the energization of said voltage responsive operating means above the energization of said voltage responsive operating means for higher of said different numbers of ampere-turns by an amount sufficing to provide the same response of said translating means for each of said ranges.

6. In a measuring device for measuring a function of the product of voltage and current in an electrical circuit and for providing the same response for each of a plurality of ranges of current, operating means for said measuring device including a plurality of current windings, means for energizing certain of said windings for each of said ranges of current, said windings being arranged to provide less ampere-turns for currents in certain of said ranges than for corresponding currents in other of said ranges of current, a plurality of voltage responsive operating means for said measuring device, said measuring device including translating means responsive to the combined energizations of said operating means, means effective when said current windings are arranged to provide said lesser ampere-turns for energizing part only of said voltage responsive operating means in accordance with the voltage of the circuit to be measured, and means effective when said current windings are arranged to provide a greater number of ampere-turns for corresponding currents in other of said ranges for energizing all of said voltage responsive operating means, said voltage responsive operating means being proportioned to provide the same response of said translating means in each of said ranges of current.

7. In a measuring device for measuring a function of the product of voltage and current in an electrical circuit and for providing the same response for each of a plurality of ranges of current magnitudes, means for operating said measuring device including a plurality of current windings, means for increasing the number of effective turns of said windings for the lesser of said ranges of current magnitudes, said windings being arranged to provide different numbers of ampere-turns for corresponding currents in said ranges which are intended to provide the same response of said measuring device, a plurality of voltage windings, said measuring device including translating means responsive to the combined energizations of said current and voltage windings, means connecting all of said voltage windings for energization when said current windings are connected to provide a relatively small number of ampere-turns in certain of said ranges of current, said last-named means including means connecting part only of said voltage windings for energization when said current windings are connected to provide a relatively large number of ampere-turns in other of said ranges of current, said voltage windings being proportioned to provide the same response of said translating means to corresponding values of current in each of said ranges of current.

8. In a meter device for measuring electrical energy and for providing the same response for corresponding currents in each of a plurality of ranges of current magnitude, means for operating said meter device including a plurality of current windings, control means for varying the arrangement of said windings in accordance with the range of current magnitude to be measured, said windings providing a smaller number of ampere-turns for a current in a first one of said ranges than for a corresponding current in a second one of said ranges which is intended to produce the same response in said measuring device, voltage winding means associated with said current windings, said voltage winding means and said current windings cooperating when energized to operate said meter device, control means for increasing the voltage applied to said voltage winding means in said first range sufficiently above that applied to said voltage winding means in said second range to provide similar responses of said meter device in said ranges for corresponding currents, and common means for operating said control means.

9. In a measuring device for measuring a function of the product of voltage and current in an electrical circuit and for providing the same response for each of a plurality of ranges of current, means for operating said measuring device including a plurality of current windings, means for energizing certain of said windings for each of said ranges of current, said windings being arranged to provide less ampere-turns for currents in certain of said ranges than for corresponding currents in other of said ranges of current, a plurality of voltage windings for said measuring device, translating means responsive to the energization of said windings, means selectively operable for connecting said voltage windings in series or in parallel for operation at either of two voltages, and means effective when said current windings are arranged to provide said lesser ampere-turns for increasing the effective energization of said measuring device by said voltage windings sufficiently to provide the same response of said translating means for each of said ranges.

10. In a meter for measuring a function of the product of voltage and current in an electrical circuit and for producing the same response for each of a plurality of ranges of current, a plurality of current windings, control means for arranging said current windings in different circuit combinations each designed for energization in a separate one of a plurality of ranges wherein the rated load currents are respectively, 0.5, 1.5, 5, 15 and 50 amperes, and voltage-responsive operating means for said meter, translating means responsive to the combined energizations of said current windings and said voltage-responsive operating means, said voltage-responsive operating means cooperating with said control means and current windings to provide the same response of said translating means when the applied voltage is constant and the current supplied to said meter has any of the values 0.5, 1.5, 5, 15 and 50 amperes in the corresponding ranges thereof.

11. In a meter for measuring a function of the products of voltage and current in an electrical circuit and for producing the same response for each of a plurality of ranges of current, operating means for said meter including a plurality of current windings, control means for arranging said current windings in different circuit combinations each designed for energization in a separate one of a plurality of ranges wherein the rated load currents are respectively, 5, 12½ and 50 amperes, and voltage energizing means for said meter, said voltage energizing means cooperating with said control means and current windings to provide the same response of said meter when the applied voltage is constant and the current supplied to said meter has any of the values 5, 12½ and 50 amperes.

12. In a measuring device for measuring a function of the product of voltage and current in an electrical circuit and for providing the same response for each of a plurality of ranges of current, a magnetic structure having an air gap, current winding means associated with said magnetic structure, said current winding means being effective when energized for directing a current magnetic flux through said air gap, voltage winding means associated with said magnetic structure, said voltage winding means being effective when energized for directing a voltage magnetic flux through said air gap, armature means disposed in said air gap for rotation relative to said magnetic structure, said magnetic fluxes coacting to apply to said armature means a torque acting to rotate said armature relative to said magnetic structure, said current winding means comprising a plurality of windings, connecting means operable for connecting said windings in various circuit relationships, each of said circuit relationships being designed for operation over a predetermined separate current range having a rated current differing from that of other of said current ranges, said circuit relationships when energized by their respective rated currents producing different values of said current magnetic flux, and means for modifying the energization of said voltage winding means to produce a different value of voltage magnetic flux for each of said values of current magnetic flux proportioned to apply the same predetermined torque to said armature means for all of said values of current magnetic flux.

13. In a measuring device for measuring a function of the product of voltage and current in an electrical circuit and for providing the same response for each of a plurality of ranges of current, a magnetic structure having an air gap, current winding means associated with said magnetic structure, said current winding means being effective when energized for directing a current magnetic flux through said air gap, voltage winding means associated with said magnetic structure, said voltage winding means being effective when energized for directing a voltage magnetic flux through said air gap, armature means disposed in said air gap for rotation relative to said magnetic structure, said magnetic fluxes coacting to apply to said armature means a torque acting to rotate said armature relative to said magnetic structure, said current winding means comprising a plurality of windings, first connecting means operable for connecting said windings in various circuit relationships, each of said circuit relationships being designed for operation over a predetermined separate current range having a rated current differing from that of other of said current ranges, said circuit relationships when energized by their respective rated currents producing different values of said current magnetic flux, said voltage winding means comprising first winding means effective when energized from a voltage source for producing a first voltage magnetic flux which cooperates with a first one of said different values of current magnetic flux to apply a predetermined torque to said armature element, second winding means effective when energized in conjunction with said first winding means from said voltage source for producing a second voltage magnetic flux which cooperates with a second one of said different values of current magnetic flux to apply said predetermined torque to said armature element, and second connecting means selectively operable for connecting said first winding means alone or for connecting both said first winding means and said second winding means for energization from a voltage source.

14. In a measuring device for measuring a function of the product of voltage and current in an electrical circuit and for providing the same response for each of a plurality of ranges of current, a magnetic structure having an air gap, current winding means associated with said magnetic structure, said current winding means being effective when energized for directing a current magnetic flux through said air gap, voltage winding means associated with said magnetic structure, said voltage winding means being effective when energized for directing a voltage magnetic flux through said air gap, armature means disposed in said air gap for rotation relative to said magnetic structure, said magnetic fluxes coacting to apply to said armature means a torque acting to rotate said armature relative to said magnetic structure, said current winding means comprising a plurality of windings, first connecting means operable for connecting said windings in various circuit relationships, each of said circuit relationships being designed for operation over a predetermined separate current range having a rated current differing from that of other of said current ranges, said circuit relationships when energized by their respective rated currents producing different values of said current magnetic flux, said voltage winding means comprising first winding means effective when energized from a voltage source for producing a first voltage magnetic flux which cooperates with a first one of said different values of current magnetic flux to apply a predetermined torque to said armature element, second winding means effective when energized in conjunction with said first winding means from said voltage source for producing a second voltage magnetic flux which cooperates with a second one of said different values of current magnetic flux to apply said predetermined torque to said armature element, second connecting means selectively operable for connecting said first winding means alone or for connecting both said first winding means and said second winding means for energization from a voltage source, and common control means for operating both said first and said second connecting means from conditions suitable for producing said first voltage magnetic flux and said first one of said different values of current magnetic flux to conditions suitable for producing said second voltage magnetic flux and said second one of said different values of current magnetic flux.

15. In a measuring device for measuring a function of the product of voltage and current in an electrical circuit and for providing the same response for each of a plurality of ranges of current, a magnetic structure having an air gap, current winding means associated with said magnetic structure, said current winding means being effective when energized for directing a current magnetic flux through said air gap, voltage winding means associated with said magnetic structure, said voltage winding means being effective when energized for directing a voltage magnetic flux through said air gap, armature means disposed in said air gap for rotation relative to said magnetic structure, said magnetic fluxes coacting to apply to said armature means a torque acting to rotate said armature relative to said magnetic structure, said current winding means comprising a plurality of windings, connecting means operable for connecting said windings in various circuit relationships, each of said circuit relationships being designed for operation over a predetermined separate current range having a rated current differing from that of other of said current ranges, said circuit relationships when energized by their respective rated currents producing different values of said current magnetic flux, transforming means for controlling the voltage applied to said voltage winding means from a source of voltage, and adjusting means associated with said transforming means for modifying the voltage applied to said voltage winding from the source of voltage to produce a different value of voltage magnetic flux for each of said values of current magnetic flux, said values of voltage magnetic flux being proportioned to apply the same predetermined torque to said armature means for all of said values of current magnetic flux.

16. In a measuring device for measuring a function of the product of voltage and current in an electrical circuit and for providing the same response for each of a plurality of ranges of current, a magnetic structure having an air gap, current winding means associated with said magnetic structure, said current winding means being effective when energized for directing a current magnetic flux through said air gap, voltage winding means associated with said magnetic structure, said voltage winding means being effective when energized for directing a voltage magnetic flux through said air gap, armature means disposed in said air gap for rotation relative to said magnetic structure, said magnetic fluxes coacting to apply to said armature means a torque acting to rotate said armature relative to said magnetic structure, said current winding means comprising a plurality of windings, connecting means operable for connecting said windings in various circuit relationships, each of said circuit relationships being designed for operation over a predetermined separate current range having a rated current differing from that of other of said current ranges, said circuit relationships when energized by their respective rated currents producing different values of said current magnetic flux, transforming means for controlling the voltage applied to said voltage winding means from a source of voltage, adjusting means associated with said transforming means for modifying the voltage applied to said voltage winding from the source of voltage to produce a different value of voltage magnetic flux for each of said values of current magnetic flux, said values of voltage magnetic flux being proportioned to apply the same predetermined torque to said armature means for all of said values of current magnetic flux, and common control means for said connecting means and said adjusting means, said control means operating said connecting means and said adjusting means simultaneously to maintain said predetermined torque for all of said values of current magnetic flux.

AMBROSE J. PETZINGER.